Patented Apr. 12, 1949

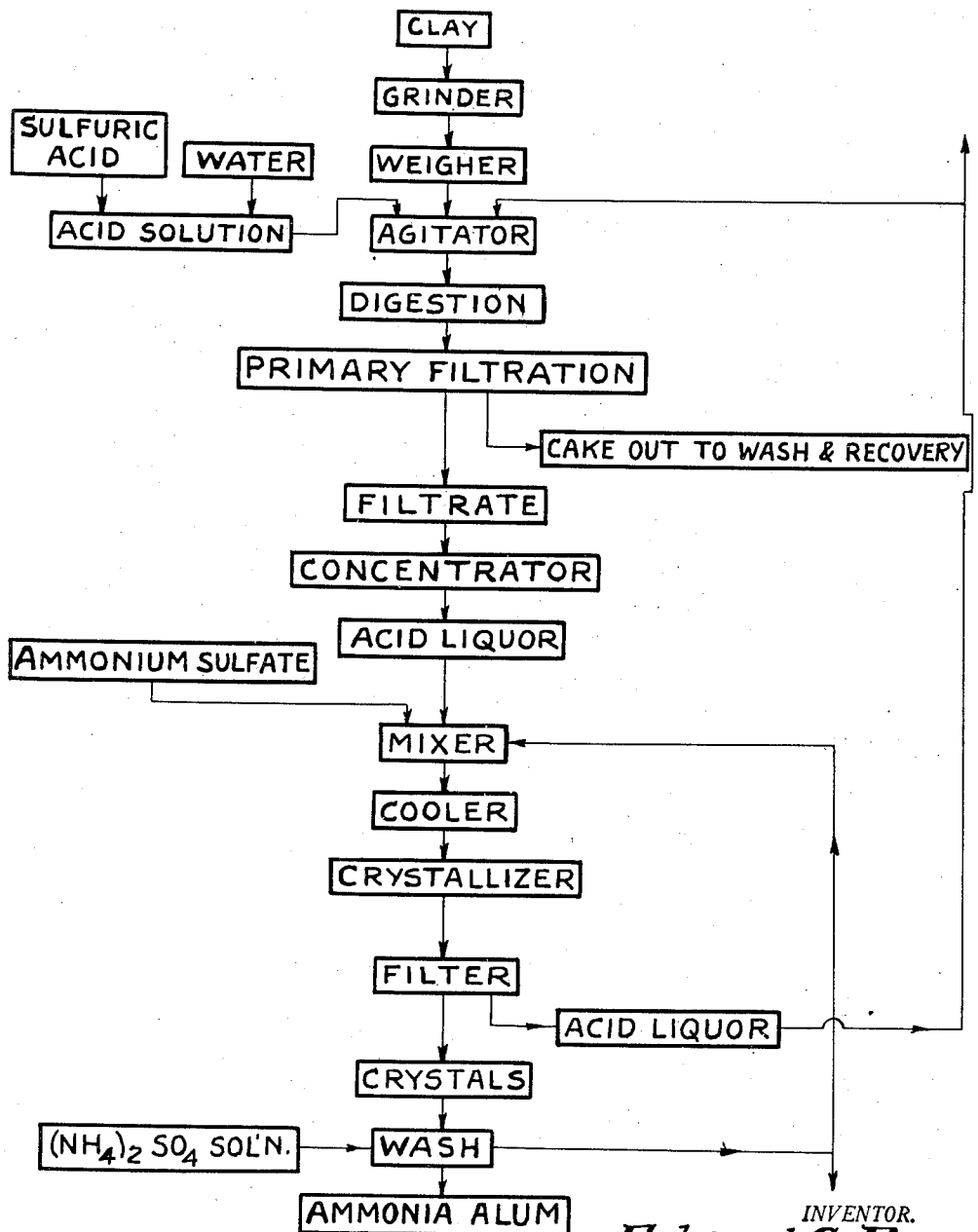

2,467,271

UNITED STATES PATENT OFFICE 2,467,271

PROCESS FOR PRODUCTION OF AMMONIUM ALUM FROM ACID LIQUORS

Edward S. Peer, Los Angeles, Calif., assignor to Filtrol Corporation, Los Angeles, Calif., a corporation of Delaware Application March 10, 1945, Serial No. 582,157

16 Claims. (Cl. 23—118)

This invention relates to a method for the production of ammonium alum. More particularly, it relates to a process for producing ammonium alum from the waste acid liquors resulting from the activation of meta-bentonite clay with sulfuric acid.

It is an object of this invention to produce ammonium alum in a simple and direct process.

It is another object of this invention to provide a means for obtaining ammonium alum from acid liquors which contain mixed salts including iron salts without an involved purification process for separating said undesired salts. It is a further object to provide a process which can be used for directly producing ammonium alum from the liquors now wasted as a part of the process for the activation of clays with sulfuric acid.

Aluminum silicate clays, particularly of the meta-bentonite or sub-bentonite type, are treated with sulfuric acid in order to produce an adsorbent and catalyst of greater efficiency than obtainable from natural clays. In this activation process, as it is called, the clay is charged into agitators which are filled with sulfuric acid solution of sufficient quantity and strength to attack the clay substance. The acid liquor becomes charged with dissolved sulfates of the cations extracted from the clay. The principal sulfate formed in the reaction solution is that of aluminum. This partial conversion of clay substance into the respective sulfates is aided by the application of heat, which may conveniently be done by use of a steam jet in the agitator. This hot digestion proceeds for six to eight hours, following which the slurry of clay in the acid treating liquor is discharged to a filter or to a wash system. The filter cake may be washed as by a direct wash on the filter, or the clay solids in the wash system are thoroughly washed with warm water as in a continuous countercurrent decantation system. The washed activated clay solids are then dried and sized for use as adsorbent and catalysts.

The acid liquor thus produced contains free acid and aluminum and iron salts as well as the salts of Ca, Mg, Ti, etc. Both ferrous and ferric sulfate are in the liquor with the ferrous sulfate in the preponderant proportion of iron salts. Such liquor, therefore, constitutes a valuable source of alumina. Such alumina is valuable for use and its economic recovery would constitute an important contribution to this art.

The free acid is also useful for recycling to the treatment of fresh clay. This recycling may be done directly where the acid concentration of the liquor approximates that of the starting treat as where acid was added during the treatment and no dilution of the liquor has occurred in the filtering step. The acid may be concentrated before recycling or it may be recycled after a make-up with fresh acid as where the acid concentration of the treater liquor has dropped during treatment or where dilution during washing has occurred.

In all such cases, however, the aluminum sulfate acts as contaminant and unless recovered would build up in concentration to an undesirable degree as recycling occurs.

I have been able as a result of my invention to remove such excess aluminum sulfate in the form of ammonium alum and thus not only have obtained an economic recovery of the aluminum from the previously waste liquor but also have been able by such methods to recondition the waste acid liquor so that it may be recycled to treat more clay in cycles of operation.

The filtrate from the foregoing acid treatment is the source of the liquor used, according to my invention, for the production of ammonium alum. While it may be formed as filtrate, the acid liquor may be separated from the clay by decantation. To facilitate such separation either by filtration or by decantation, the treated slurry may be diluted with water in order that there will be a greater recovery of the acid and salts therefrom. However, it is not desirable to greatly dilute the slurry if this can be avoided, for then concentration of the liquor prior to forming the ammonium alum may be required.

The liquor from the primary filtration or the decantation operation may then pass to the concentrator should it have been unduly diluted in the separation and washing process. If, however, the acid treatment is carried out so that the acid concentration at the end of the treatment is maintained high, the filtrate or decantate may be sufficiently concentrated so that an evaporation process for concentrating the liquor may not be necessary. This strong acid liquor from the concentrator or the filtrate or decantate may then pass to a mixer where ammonium sulfate is added with thorough mixing in order to dissolve the added reagent which may be in its crystalline form. The heat present in the acid liquor is ordinarily sufficient to aid in the dissolving of the ammonium sulfate. The clay slurry at the conclusion of the activation process is close to the boiling point of water on account of the added steam used in the digestion. If the solids are separated immediately from this slurry as by filtration, the resultant liquor is still hot, as for example 150° F. to 190° F., e. g., 170° F., at which temperature an efficient formation of the desired ammonium alum takes place on the addition of the ammonium sulfate.

In the addition of the ammonium sulfate to the liquor, ammonium alum is formed by combination of the ammonium sulfate with the aluminum sulfate of said acid liquor. To separate the ammonium alum, the solution is passed to a cooler; or it may be permitted to stand for a time, as overnight, until it has cooled to room temperature. The cool liquor goes to the crystallizer which may be a unit wherein the liquor is cooled while the crystals are being formed. The supernatant mother liquor from the crystals may be pumped off or the entire liquor with the crystals can be continuously filtered for removal of the mother liquor. The crystals may be washed, for example, with cold saturated ammonium alum solution. Drying of the crystals at a low temperature then follows, resulting in the production of ammonium alum substantially free from iron and other undesired impurities.

A better understanding of my process for the production of ammonium alum can be had by referring to the accompanying drawing, giving a general flow diagram which illustrates the process.

Meta-bentonite, also termed sub-bentonite, clay is a type of bentonite clay in which the base exchangeable ions are composed of Ca and Mg. Such clays have been for many years leached with acid to produce highly active adsorbent used as catalysts. The clay which has been selected for the production of the adsorbent and/or catalyst in the activation process is fed to a grinder where it is ground to a suitable size, as for example all passing $\frac{1}{4}''$ mesh. It may then be passed to bins, not shown, or directly to a weigher which charges it into an agitator. Simultaneously, or previous to the addition of the clay to the agitator, a sulfuric acid solution is added to the agitator. To this liquor may be added the acid recycled from the ammonium alum apparatus as shown. The mixture of acid solution is then thoroughly agitated by the use of a steam jet in the bottom of the agitator as well as an air jet which provides additional agitation to the clay slurry. The digestion of the clay and acid with the steam and with the air agitation is then continued from six to eight hours. During this treatment the clay substance is attacked by the sulfuric acid to reduce the alumina and iron oxide content of the clay in an amount to yield an acid-treated clay containing from about 10% to 25% (clay calculated as volatile free) of $Al_2O_3$ and $Fe_2O_3$. The extracted clay is found in the acid liquor in the form of soluble sulfates of alumina, iron, titanium, magnesium, and calcium. Other sulfates may also be formed in relatively small amounts although aluminum sulfate is the major salt constituent of the resultant liquor. The extraction is interrupted to give some free acid remaining in the solution, that is, the acid does not completely react with the clay. If desired, fresh acid may be added during the digestion to maintain the acidity at the desired level.

The sulfuric acid employed may vary from about 10% to 60% concentration, calculating concentration as based on the total water in the clay slurry including both the free water and the water associated with the clay as determined by ignition of the clay. The total acid employed (termed dosage) may vary from 5 to 125 weight percent of the clay, calculating the acid as $H_2SO_4$ and the clay as volatile free as determined by ignition. The acid concentration may be allowed to fall due to consumption by reaction with the clay, or it may be maintained constant by adding the acid during the treat.

Thus the acid concentration at the start of the treat may range from 8 to 25% and the concentration at the end of the treat in the case where no acid is added during the treatment may be in the range of 2 to 10%, and the concentration of aluminum salts in the acid liquor, when calculated as $Al_2O_3$, will be in the range of about 2% to about 8% by weight of the acid liquor when leaching the clay to reduce the aluminum and $Fe_2O_3$ content of the acid-treated clay to 10% to 25% of the volatile free clay. Most such clays contain iron compounds and the liquor produced in the treatment contains iron sulfate primarily as ferrous sulfate in an amount which, when calculated as $Fe_2O_3$, may range from 2 to 60% of the $Al_2O_3$ content of the liquor. When the acid concentration is maintained constant by the addition of acid during the treat, the terminal acid concentration at the end of the treat will be about that of the starting liquor, say, from 5 to 20%, and the $Al_2O_3$ and $Fe_2O_3$ content will be as given above. The alumina sulfate concentration is of course higher the higher the concentration of the acid employed in the extraction. Thus when employing acids of concentration of 40 to 60%, the terminal acid concentrations may be even higher than about 20%.

The solids which form the adsorbent and catalyst may be separated from the acid liquor by filtration. Before this filtration, however, the slurry may, if desired, be diluted in order to get a greater yield of liquor. Thus if a volume of hot water equal to the volume of the clay slurry or equal to about one-half volume of the slurry is thoroughly mixed with the treated slurry, then a greater proportion of the liquor which is entrained in and around the clay particles can be recovered. Or such water may be added as a spray or as a displacement wash to the filter cake direct. The cake from this filtration is then discharged, or if not sufficiently washed on the filter, it may be further washed in a decantation system, such as Dorr thickeners, where the salts may be largely eliminated by the use of a countercurrent flow of warm wash water. After such washing, the solids are filtered, as on the continuous Oliver filter, followed by drying at a relatively low temperature and a sizing for the desired commercial application. For example, the product may be finely pulverized for some uses as an adsorbent on tarry oils; or it may be left moderately coarse as it is received from the drier for use in the purification of lubricants; or again it may be formed into pellets by the extrusion of the washed and dewatered solids in order to form a material for use in catalytic reactors in the conversion of petroleum hydrocarbons.

Returning now to the filtrate from the filtration, the filtrate liquor and the wash liquor are passed to a concentrator where their strength may be increased by evaporation in order to obtain satisfactory formation of ammonium alum. This is useful when the acidity of the liquor is below about 2% $H_2SO_4$. A concentrator may be of value, however, only where the liquor is of low acid and salt concentration, as where the agitator contents were diluted before the primary filtration, as mentioned, in order that a greater quantity of the liquor would be obtained, or where the separation of the acid-treated clay occurs in a countercurrent washing and decantation system as in Dorr thickeners. The acid liquor may also be concentrated if the acid or salt concentration of the acid liquor at the end of the acid extraction is too low. The concentrator may be a simple open boiling pot or it may be a more elaborate means of concentration as in a vacuum system or multiple effect evaporators. The concentration is carried to establish an acid concentration of from about 2 to about 20%.

The acid liquor is then passed to the mixer where ammonium sulfate is added. The mixer may be of a simple form as an agitator with non-corrodible arms and shaft revolving in a vessel with a protective lining. The ammonium sulfate which is added to the acid liquor can be of commercial purity, for example, one with an analysis of about 21% nitrogen content is sufficiently pure, and it may be in its usual crystalline form. A vigorous mixing dissolves the ammonium sulfate crystals in the acid solution. Aeration is avoided in this operation to prevent oxidation of the iron in the solution to the ferric state. The formation of ammonium alum then takes place in the solution with the abstraction of the aluminum sulfate from the liquor to combine with the added ammonium sulfate to form the double salt which constitutes the ammonium aluminum sulfate or, as it is commonly known, ammonium alum, with the formula $$(NH_4)_2SO_4 \cdot Al_2(SO_4)_3 \cdot 24H_2O$$

usually written 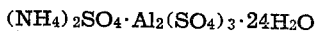. The temperature of addition in maintained sufficiently high to retain amonium alum completely in solution during the addition of all the required ammonium sulfate. A temperature of about 150° to 200° F. will be found sufficient for this purpose.

The formation of this amonium alum appears to be selective contrary to what might be expected in solutions of this character which contain Ca, Mg, Ti, and Fe salts; that is, there is formed the ammonium alum substantially to the exclusion of the formation of a compound of ammonia with iron or with some of the other constituents which are present in the liquor. By proper control of the extraction, I can utilize substantially all of the added ammonium sulfate, recovering the same as ammonium alum.

The ammonium alum may be crystallized from this solution in pure form. Crystallization may be effected by cooling, and room temperature, i. e., 60 to 80° F., will usually be found sufficient to cause satisfactory separation of the alum crystals. The supernatant mother liquor can be decanted in order to leave the crystals in place or a continuous filtration may be used to effect crystal separation, or this crystal separation may be accomplished by centrifugal separation.

The acid liquor separated from the ammonium alum crystals, which may contain aluminum sulfate, can then be recirculated in whole or in part to the agitator in order to treat additional clay. When the recirculation of the acid liquor will cause an undesirable build-up of impurities such as iron salts in the acid liquor which is produced at the end of the clay extraction, as for example where wash liquor from the washing of the alum crystals (as hereafter described) is recirculated to the alum formation step, a part of the separated mother liquor is discharged from the system. In order to prevent the ferric salt concentration in the acid liquor, such as obtain at the end of the clay extraction stage, from increasing to the extent that the ratio of ferric to aluminum salts (expressed as $Fe_2O_3:Al_2O_3$) equals more than 0.4 to 0.6, it may be necessary to recirculate to the acid leaching step only a portion of the separated mother liquor which contains both ferric and ferrous iron so that the ferric salts thus recirculated, when added to the ferric salts extracted from the clay, will not exceed a ratio to alumina in the acid liquor of more than about 0.4 to 0.6. When this ratio exceeds this limit, formation of ferric ammonium alum may result in sufficient amount to contaminate the ammonium alum crystals.

The crystals of ammonium alum are washed by displacement wash. Water may be used, in which case it is discharged from the system. I find that the solubility of the ammonium alum is suppressed by using an ammonium sulfate solution in place of water. A solution containing about 5 to about 20% of ammonium sulfate, and preferably about 10 to about 20% of ammonium sulfate, is desirable. The higher the concentration of ammonium sulfate, the lower the solubility of ammonium alum. However, if the ammonium sulfate solution is too concentrated, for example, in excess of about 20%, particularly if the contamination of the alum crystals is by ferrous or ferric salts, there is danger of forming ammonium iron alum. The ammonium sulfate wash liquor may be recirculated in whole or in part or with additional $(NH_4)_2SO_4$ if necessary to the alum-forming step to cause further crystallization of the ammonium alum. The recirculated impurities in the wash liquor may be discharged in the main flow with mother liquor if only a part of the mother liquor is recirculated to the original clay treat.

Instead of ammonium sulfate solution as crystal wash liquor I may use an ammonium alum solution of high concentration such as a saturated solution. This will inhibit the solubility of the alum crystals but will leach out impurities. The wash liquor thus produced may be added to the acid liquor along with or prior to the addition of ammonium sulfate and impurities will be discharged with the portion of mother liquor which is discharged from the system in the same manner as described for ammonium sulfate wash.

I have found that the free acid present in the liquor at the end of the treat does not interfere with the formation of the alum. In fact, it assists the ammonium sulfate in the formation of the alum in the acid liquors produced in the leaching of meta-bentonites with sulfuric acid. Less ammonium sulfate appears to remain in the liquor than would be expected when the formation of ammonium alum is made by reacting with pure aluminum sulfate dissolved in water without free acidity.

The free acid additionally appears to protect the ferrous sulfate in the acid liquor from oxidation to the ferric state and the contamination of the ammonium alum by the iron compounds is minimized. By limiting the degree of extraction of the clay by the acid employed to give acid liquor containing 2% or more of free acid, i. e., present as $H_2SO_4$, the iron in the liquor produced by treating meta-bentonites in the above procedures is substantially entirely in the ferrous state, for example, 90 to 95% or more of the iron present as salts in said acid liquor is ferrous iron. In such case, I find that the ammonium alum may be formed and separated as crystals substantially free of contamination by iron salts.

I therefore desire to limit the degree of extraction and the concentration of the acid and the amount employed in th extraction of the clay to yield a liquor at the end of the treat containing a free sulfuric acid concentration of greater than about 2%.

I have also found that it is undesirable to remove completely aluminum salts from the liquor by employing excessive amount of ammonium sulfate. Too rigorous an extraction of aluminum salts from the liquor results in the formation of an alum contaminated by iron salts and also results in an excessive concentration of ammonium sulfate in the residual mother liquor, thus requiring the addition of excessive amounts of $(NH_4)_2SO_4$ to obtain the desired crystallization. I have found that it is desirable to limit the extraction of aluminum salts from the acid liquors by the formation of ammonium alum so that the residual mother liquor shall contain an amount of aluminum salts which, when calculated as $Al_2O_3$, is not less than about 0.2% by weight based on the total residual mother liquor.

Extraction of the aluminum salts so to leave in the residual mother liquor aluminum salt concentration (expressed as $Al_2O_3$) in excess of about 1 to 2% does not reduce the ammonium sulfate loss in the mother liquor appreciably below the loss of ammonium sulfate suffered when leaving a concentration of about 1 to 2%. The ammonium sulfate concentration in the mother liquor at such $Al_2O_3$ concentration is of the order of one percent. An increase in the $Al_2O_3$ concentration above 1 to 2% reduces the ammonium sulfate concentration in the mother liquor only a slight amount. This small decrease in the loss of ammonium sulfate results, however, in a substantial loss of aluminum salts in the mother liquor. As a practical matter, therefore, I find it desirable to cause a degree of extraction of aluminum salts as ammonium alum so as to leave not more than about 2% and preferably about 1.5% or less of aluminum sulfate (expressed as $Al_2O_3$) in the residual mother liquor.

With normal liquors as produced by the above procedures as indicated above, the iron salts, when caculated as $Fe_2O_3$ may vary from about 5% to about 60% of the aluminum salts, calculated as $Al_2O_3$. In order to hold the ratio of iron, calculated as $Fe_2O_3$, to aluminum calculated as $Al_2O_3$ in the alum to less than about 0.02, I have found that, for the acid liquor produced by the above procedures, it is desirable to add $(NH_4)_2SO_4$ in such quantity that the mother liquor after separation of the crystals contains aluminum salt concentration, which, when expressed as $Al_2O_3$, is not less than about 0.2 to 0.4%, for example about 0.3% by weight based on total mother liquor.

As indicated above, I have found that I may limit the loss of $(NH_4)_2SO_4$ in the mother liquor by limiting the degree of aluminum conversion to ammonium alum in order to limit the amount of $(NH_4)_2SO_4$ required. In the case of the liquors produced and treated by the above procedure, I have found that, if the aluminum extraction as ammonium alum is carried to a degree to give a concentration, in the mother liquor, of aluminum salts which, expressed as $Al_2O_3$, is lower than about 0.2 to 0.4%, the losses of the $(NH_4)_2SO_4$ in the mother liquor become excessive. By maintaining the aluminum salt concentration to above the said lower limits, I can hold the $(NH_4)_2SO_4$ in the mother liquor to less than about 10% to 15% of the mother liquor. Thus, for example, by decreasing the concentration of aluminum salts (expressed as $Al_2O_3$) in the mother liquor, after crystallization of alum, to less than about 0.2 to 0.4%, for instance to 0.1%, the concentration of $(NH_4)_2SO_4$ in the mother liquor rises to above about 40%. On the other hand by holding the residual aluminum salt concentration (expressed as $Al_2O_3$) in the mother liquor to a higher level in the order of 1.5 to 2% or more of the mother liquor, I can limit the $(NH_4)_2SO_4$ concentration in the mother liquor to less than about 1%, for example 0.5%.

I may, therefore, produce ammonium alum crystals substantially free of iron salts with an $Fe_2O_3$ to $Al_2O_3$ ratio in the ammonium alum of about 0.02 or less and limit the loss of $(NH_4)_2SO_4$ in the mother liquor by limiting the crystallization of the ammonium alum crystals to leave in the mother liquor a concentration of aluminum salts which, when expressed as $Al_2O_3$, is about 0.3% or more by weight of the mother liquor with a loss of $(NH_4)_2SO_4$ in the mother liquor of about 10 to 15% or less by weight of the mother liquor.

The alum product thus produced is substantially free of iron containing an $Fe_2O_3$ to $Al_2O_3$ ratio of about 0.02 or less. Additionally a simple recrystallization would produce alums substantially free of iron, to wit, with $Fe_2O_3:Al_2O_3$ ratio of 0.002 or less. The alum is also substantially free of calcium or magnesium salts. This is entirely surprising due to the fact that it would have been expected that the excess sulfate ion present as free acid and as added $(NH_4)_2SO_4$ would have caused precipitation of calcium and magnesium sulfates by common ion effect to contaminate the alum.

As examples of my process and for purposes of illustrating the effect of the various process variables described above and not for the purpose of limiting the same, the following are given by way of illustration.

*Example I*

A clay of the meta-bentonite type, having the following typical composition, was treated with a dosage of 65% sulfuric acid in the manner described; that is, fresh acid was added during the treat to maintain the acid at a concentration of about 8 to 10%.

|   | Per cent |
|---|---|
| Silica, $SiO_2$ | 67.26 |
| Titanium oxide, $TiO_2$ | 0.27 |
| Aluminum oxide, $Al_2O_3$ | 19.53 |
| Ferric oxide, $Fe_2O_3$ | 1.84 |
| Manganese oxide, MnO | 0.82 |
| Magnesium oxide, MgO | 6.93 |
| Calcium oxide, CaO | 3.21 |

The activated pulp was screened through eight mesh screen and then charged to a filter. The filtrate from this analyzed as follows:

| Acid | per cent | 8.36 |
|---|---|---|
| $Al_2O_3$ | do | 3.79 |
| $Fe_2O_3$ | do | 0.37 |
| Specific gravity | | 1.245 |

Seventeen liters of this filtrate were heated to 170° F. with a steam coil; 546 grams (2.5% by weight) of ammonium sulfate were dissolved in the filtrate. They were added slowly with vigorous agitation. The temperature was maintained at about 150° to 170° F. during the addition of the ammonium sulfate. After mixing, the solution was allowed to stand one day. The temperature was then 65° F. The supernatant liquor was poured off and the crystals were filtered free of mother liquor in a Buchner funnel.

There was a yield of 8 lbs. and 14 ounces of crystals, which were then mixed with 500 ml. of 10% ammonium sulfate solution and filtered as before. After this displacement wash, the yield was 8 lbs. and 5 ounces. The analysis of this crystalline product was as follows:

| | Per cent |
|---|---|
| $Al_2O_3$ | 11.75 |
| $Fe_2O_3$ | 0.15 |
| $NH_4$ | 3.9 |
| $SO_4$ | 43.3 |
| Ca | 0.5 |
| Mg | Nil |

The theoretical composition of ammonium alum $[NH_4Al(SO_4)_2 \cdot 12 H_2O]$ shows 11.2% of $Al_2O_3$, which compares favorably with the 11.75% as determined as shown above. The iron content is low, being 0.15% when expressed as $Fe_2O_3$. The theoretical analysis of $NH_4$ is 3.98, which is close to the 3.9 above, and the theoretical $SO_4$ content is 42.37 compared to 43.3 above.

The $Al_2O_3$ recovered in this experiment was 55.4% of that in the starting filtrate. This is equivalent to 3.6% of the treated clay on a volatile free basis. The mother liquor after removal of the alum crystals contained 1.7% aluminum salts when expressed as $Al_2O_3$; but it is to be noted that in this example an amount of ammonium sulfate was used stoichiometrically equivalent to only a little over ½ of the $Al_2O_3$ content.

Practically 100% of the ammonium sulfate used appeared in the ammonium alum produced. The analysis of the product shows that it contains an amount of ammonium sulfate equivalent to 14.3% of the alum produced. The amount of ammonium sulfate actually employed was equivalent to 14.4% of the weight of the product produced.

*Example II*

Clay, similar to the foregoing Example I, was treated in the same manner with 40% sulfuric acid at 12.5% concentration without acid addition during the treat. The activated clay was passed to a filter. The filtrate analyzed as follows:

| | | |
|---|---|---|
| $Al_2O_3$ | per cent | 2.4 |
| $Fe_2O_3$ | do | 0.2 |
| Acid | do | 3.2 |
| Specific gravity | | 1.137 |

In this trial, granulated ammonium sulfate was added to the hot (165° F.) filtrate with vigorous stirring and without aeration. The crystals were separated after the solution had cooled to room temperature. The mother liquor had the following composition:

| | Per cent |
|---|---|
| $Al_2O_3$ | 0.33 |
| $Fe_2O_3$ | 0.2 |
| Acid | 3.6 |

The yield of ammonium alum was 13 lbs. equivalent to 82% of $Al_2O_3$ of the alumina content of the acid liquor. The acid content of the mother liquor was substantially equal to the acid content of the acid liquor.

As stated previously, a large excess of ammonium sulfate was used in this example. This resulted in the presence of 10.7% by weight of $(NH_4)_2SO_4$ in the mother liquor with an aluminum sulfate concentration equivalent when expressed as $Al_2O_3$ to 0.33% by weight of the mother liquor.

The analysis of the recrystallized product on an air dry basis was as follows:

| | Per cent |
|---|---|
| $Al_2O_3$ | 11.46 |
| $Fe_2O_3$ | 0.02 |
| $NH_4$ | 3.89 |
| $SO_4$ | 42.36 |
| CaO | Trace |
| MgO | Trace |

It will be noted by referring to the product obtained in Example I that this material closely approximates the theoretical ammonium alum and has a lower iron content than in the preceding product.

One of the characteristics of this process is that the separation of the ammonium alum is not adversely affected by the presence of free sulfuric acid in the solution. Also, the presence of other sulfates in the solution as calcium, magnesium, and iron sulfates does not affect the crystallization and separation of the ammonium alum. The small influence of the iron sulfate on the product formed is of particular importance. The iron sulfate, if it be in the ferrous form, is left in solution and may be readily discharged from the system in my operation. Another characteristic of the process is that the alumina in the solution can be readily recovered in the form of an alum. Even the small amount which is left in the mother liquor is not lost if recycling effects are used.

The alumina in the solution is recovered by this process as ammonium alum, which is an important commercial product. It has uses in the arts as for paper sizing, dyeing, tanning, etc. Thus there is derived from a waste solution an important product of commerce. Such a recovery of alumina may be made to leave as little as one-half or even one-third of one percent of $Al_2O_3$ present in the solution.

An initial advantage of this process is that drying or calcining of the clay is not required before the acid treatment which produces the sulfate solution. An operational advantage of this process is that neutralization is not required. The filtration difficulties, usual in neutralization processes which involve the formation of alumina and iron hydrates, are avoided. Another feature of importance is that the heating and cooling requirements are at a minimum. If the liquor is used as directly obtained from the agitator, no heating at all may be required. Also the cooling requirement is small and room temperature may be sufficient to obtain a satisfactory yield of ammonium alum.

The end product of this operation lends itself to purification by simple means as washing with ammonium alum solution or recrystallization.

The product may also be used to impregnate the acid activated clay produced in the same process as by mixing the clay with the alum solution and neutralizing with ammonia to give a hydrated alumina which combines with the acid activated clay to give an activated oil cracking catalyst.

While I have described particular examples of my invention for the purpose of illustration, it should be understood that various modifications and adaptions thereof may be made without departing from the spirit of the invention as set forth in the appended claims.

I claim:
1. A process for producing ammonium alum which comprises reacting aluminum silicate clay containing iron compounds with sulfuric acid to extract alumina from the clay and to form an acid liquor containing aluminum sulfate and ferrous sulfate, controlling the extent of reaction between the clay and the acid to produce an acid liquor containing not less than about 2% of free sulfuric acid, dissolving ammonium sulfate in the acid liquor and forming crystals of ammonium alum, and separating the crystals of ammonium alum from the mother liquor.

2. A process for producing ammonium alum which comprises reacting an aluminum silicate clay with sulfuric acid and forming an acid liquor containing cations extracted from said clay and including aluminum sulfate and ferrous sulfate and free sulfuric acid in an amount not less than about 2% of free sulfuric acid, dissolving ammonium sulfate in the acid liquor and forming crystals of ammonium alum and separating the crystals of ammonium alum from the mother liquor.

3. A process for producing ammonium alum which comprises reacting an aluminum silicate clay with sulfuric acid to form an acid liquor containing aluminum sulfate, ferrous sulfate, and free sulfuric acid, adding ammonium sulfate to such acid liquor to remove aluminum sulfate from solution, to form ammonium alum crystals in amount insufficient to reduce the aluminum sulfate concentration of said liquor after removal of ammonium alum crystals below about 0.4%, separating the ammonium alum crystals from the liquor.

4. A process for producing ammonium alum which comprises reacting an aluminum silicate clay with sulfuric acid to form an acid liquor containing aluminum sulfate, ferrous sulfate, and free sulfuric acid, adding ammonium sulfate to such acid liquor to remove aluminum sulfate from solution, to form ammonium alum crystals in amount insufficient to reduce the aluminum sulfate concentration (expressed as $Al_2O_3$) of said liquor after removal of said ammonium alum crystals below about 0.2%.

5. A process for producing ammonium alum which comprises reacting an aluminum silicate clay with sulfuric acid to form an acid liquor containing aluminum sulfate, ferrous sulfate, and free sulfuric acid, adding ammonium sulfate to such acid liquor to remove aluminum sulfate from solution, to form ammonium alum crystals in amount sufficient to reduce the aluminum sulfate concentration (expressed as $Al_2O_3$) of said liquor after removal of said ammonium alum crystals to less than 2%.

6. A process for producing ammonium alum which comprises reacting an aluminum silicate clay with sulfuric acid to form an acid liquor containing aluminum sulfate, ferrous sulfate, and free sulfuric acid, adding ammonium sulfate to such acid liquor to remove aluminum sulfate from solution, to form ammonium alum crystals in amount sufficient to reduce the aluminum sulfate concentration (expressed as $Al_2O_3$) of said liquor after removal of said ammonium alum crystals to less than 2% and more than 0.2%.

7. A process for producing ammonium alum which comprises reacting an aluminum silicate clay with sulfuric acid to form an acid liquor containing aluminum sulfate, ferrous sulfate, and free sulfuric acid, adding ammonium sulfate to such acid liquor to form ammonium alum crystals, containing iron compounds in amount such that the ratio of iron expressed as $Fe_2O_3$ to the aluminum expressed as $Al_2O_3$ in the crystals is not greater than about 0.02, said removal of aluminum sulfate being, in amount, insufficient to reduce the aluminum sulfate concentration (expressed as $Al_2O_3$) of said liquor after removal of said ammonium alum crystals below about 0.4%.

8. A process for producing ammonium alum which comprises reacting an aluminum silicate clay with sulfuric acid to form an acid liquor containing aluminum sulfate, ferrous sulfate, and free sulfuric acid, adding ammonium sulfate to such acid liquor to form ammonium alum crystals containing iron compounds in amount such that the ratio of iron expressed as $Fe_2O_3$ to the aluminum expressed as $Al_2O_3$ in the crystals is not greater than about 0.02, said removal of aluminum sulfate being, in amount, insufficient to reduce the aluminum sulfate concentration (expressed as $Al_2O_3$) of said liquor after removal of said ammonium alum crystals below about 0.2%, and separating said crystals.

9. A process for producing ammonium alum which comprises reacting an aluminum silicate clay with sulfuric acid to form an acid liquor containing aluminum sulfate, ferrous sulfate, and free sulfuric acid, adding ammonium sulfate to such acid liquor to form ammonium alum crystals containing iron compounds in amount such that the ratio of iron expressed as $Fe_2O_3$ to the aluminum expressed as $Al_2O_3$ in the crystals is not greater than about 0.02, said removal of aluminum sulfate being, in amount, sufficient to reduce the aluminum sulfate concentration (expressed as $Al_2O_3$) of said liquor after removal of said ammonium alum crystals to less than 2%, and separating said crystals.

10. A process for producing ammonium alum which comprises reacting an aluminum silicate clay with sulfuric acid to form an acid liquor containing aluminum sulfate, ferrous sulfate, and free sulfuric acid, adding ammonium sulfate to such acid liquor to form ammonium alum crystals containing iron compounds in amount such that the ratio of iron expressed as $Fe_2O_3$ to the aluminum expressed as $Al_2O_3$ in the crystals is not greater than about 0.02, said removal of aluminum sulfate being, in amount, sufficient to reduce the aluminum sulfate concentration (expressed as $Al_2O_3$) of said liquor after removal of said ammonium alum crystals to less than 2% and more than 0.2%, and separating said crystals.

11. A process for producing ammonium alum which comprises reacting an aluminum silicate clay with sulfuric acid to form an acid liquor containing aluminum sulfate, adding sufficient ammonium sulfate to said acid liquor to form ammonium alum crystals and a mother liquid which, when separated from said crystals, will contain a concentration of aluminum salts which, when expressed as $Al_2O_3$, is not less than about 0.4%, said mother liquor containing a concentration of ammonium sulfate less than about 15%, and separating said crystals.

12. A process for producing ammonium alum which comprises reacting an aluminum silicate clay with sulfuric acid to form an acid liquor containing aluminum sulfate, adding sufficient ammonium sulfate to said acid liquor to from ammonium alum crystals and a mother liquor which, when separated from said crystals, will contain a concentration of aluminum salts which, when expressed as $Al_2O_3$, is not less than about 0.2%, said mother liquor containing a concentration of ammonium sulfate less than about 15%, and separating said crystals.

13. A process for producing ammonium alum which comprises reacting an aluminum silicate clay with sulfuric acid to form an acid liquor containing aluminum sulfate, adding sufficient ammonium sulfate to said acid liquor to form ammonium alum crystals and a mother liquor which, when separated from said crystals, will contain a concentration of aluminum salts which, when expressed as $Al_2O_3$, is not in excess of 2%, said mother liquor containing a concentration of ammonium sulfate less than about 1%, and separating said crystals.

14. A process for producing ammonium alum crystals which comprises reacting an aluminum silicate clay with sulfuric acid to form an acid liquor containing aluminum sulfate and ferrous sulfate, adding ammonium sulfate in amount sufficient to form ammonium alum crystals and a mother liquor which, when separated from the ammonium alum crystals, will contain a concentration of aluminum sulfate which, when expressed as $Al_2O_3$, is greater than about 0.3% and will contain a concentration of ammonium sulfate less than about 20%, separating said ammonium alum crystals, the separated ammonium alum crystals containing iron expressed as $Fe_2O_3$ in amount such that the ratio of $Fe_2O_3$ to the aluminum salt expressed as $Al_2O_3$ is not greater than about .02.

15. A process for producing ammonium alum which comprises reacting an aluminum silicate clay with sulfuric acid to form an acid liquor containing aluminium sulfate, ferrous sulfate, and containing at least about 2% free sulfuric acid, adding ammonium sulfate to such acid liquor to remove aluminum sulfate from solution, to form ammonium alum crystals in amount sufficient to reduce the aluminum sulfate concentration (expressed as $Al_2O_3$) of said liquor after removal of said ammonium alum crystals to less than 2% and more than 0.2%.

16. A process for producing ammonium alum which comprises reacting a sub-bentonite clay with sulfuric acid to form an acid liquor containing aluminum sulfate, ferrous sulfate, calcium sulfate, magnesium sulfate, and containing from about 2 to about 20% free sulfuric acid, adding ammonium sulfate to such acid liquor to remove aluminum sulfate from solution, to form ammonium alum crystals in amount sufficient to reduce the aluminum sulfate concentration (expressed as $Al_2O_3$) of said liquor after removal of said ammonium alum crystals to less than 2% and more than 0.2%.

EDWARD S. PEER.

REFERENCES CITED

The following references are of record in the file of this patent:

UNITED STATES PATENTS

| Number | Name | Date |
|---|---|---|
| 328,477 | Freist | Oct. 20, 1885 |
| 1,619,666 | Ganssen | Mar. 1, 1927 |
| 1,838,621 | Haseman | Dec. 29, 1931 |
| 1,948,888 | Sanders | Feb. 27, 1934 |

Certificate of Correction

Patent No. 2,467,271. April 12, 1949.

EDWARD S. PEER

It is hereby certified that error appears in the printed specification of the above numbered patent requiring correction as follows:

Column 12, line 70, claim 12, for the word "from" read *form*;

and that the said Letters Patent should be read with this correction therein that the same may conform to the record of the case in the Patent Office.

Signed and sealed this 18th day of October, A. D. 1949.

[SEAL]

THOMAS F. MURPHY,
*Assistant Commissioner of Patents.*